United States Patent [19]
Terado et al.

[11] Patent Number: 5,847,011
[45] Date of Patent: Dec. 8, 1998

[54] DEGRADABLE COPOLYMER AND PREPARATION PROCESS THEREOF

[75] Inventors: Yuji Terado; Chojiro Higuchi; Masanobu Ajioka, all of Kanagawa-ken, Japan

[73] Assignee: Mitsui Chemicals, Inc., Tokyo, Japan

[21] Appl. No.: 759,953

[22] Filed: Dec. 3, 1996

[30] Foreign Application Priority Data

Dec. 5, 1995 [JP] Japan .................................. 7-316882

[51] Int. Cl.$^6$ ...................................................... C08J 11/04
[52] U.S. Cl. ............................................. 521/48; 521/48.5
[58] Field of Search ....................................... 521/48, 48.5

[56] References Cited

U.S. PATENT DOCUMENTS

| | | | |
|---|---|---|---|
| 4,745,160 | 5/1988 | Churchhill et al. | 525/415 |
| 5,202,413 | 4/1993 | Spinu | 528/354 |
| 5,486,593 | 1/1996 | Tang et al. | 528/370 |

FOREIGN PATENT DOCUMENTS

| | | |
|---|---|---|
| 7-82369 | 3/1995 | Japan . |
| 7-109413 | 4/1995 | Japan . |

*Primary Examiner*—Edward J. Cain
*Attorney, Agent, or Firm*—Burns, Doane, Swecker & Mathis, L.L.P.

[57] ABSTRACT

A degradable copolymer obtained by heat-dehydration reaction of aromatic polycarbonate and aliphatic polyester in the presence of a catalyst, has degradability which cannot be exhibited by common aromatic polycarbonate, transparency equal to polycarbonate, thermal resistance which cannot be exhibited by common aliphatic polyester, melt flowability superior to common aromatic polycarbonate and other excellent characteristics, and thus can be widely used for processed articles which require severe properties.

18 Claims, No Drawings

DEGRADABLE COPOLYMER AND PREPARATION PROCESS THEREOF

BACKGROUND OF THE INVENTION AND RELATED ART

1. Field of the Invention

The present invention relates to a preparation process of a degradable copolymer comprising reacting an aromatic polycarbonate with an aliphatic polyester in the presence of a catalyst and the degradable copolymer prepared by the process.

2. Related Art

Conventionally, an aromatic polycarbonate has been known as an engineering plastic having excellent transparency, heat resistance, mechanical strength and dimensional stability. The aromatic polycarbonate is usually prepared by carrying out polymerization in the presence of an aromatic monohydroxy compound such as phenol or 4-tert-butylphenol in order to control the molecular weight of polycarbonate prepared.

However, polycarbonate terminated at the polymer chain end with phenol or 4-tert-butylphenol has disadvantage of extremely high melt-viscosity and poor melt-flowability.

A process for using a specific molecular weight modifier or a process for blending aromatic polycarbonate with an acrylic resin has been known as a process for improving the melt-flowability of aromatic polycarbonate. However, as to the latter technique, blending of acrylic resin with aromatic polycarbonate in a sufficient amount to improve the melt-flowability leads to the weak point of greatly decreasing the thermal and mechanical properties of the resin composition obtained. Consequently, the resin composition becomes difficult to provide a molded article having a large size and thin wall thickness and has caused a problem of restricting the application to decorative articles and other miscellaneous goods.

Japanese Laid-Open Patent Hei 7-109413 has disclosed that a resin composition having high melt-flowability can be obtained by blending aromatic polycarbonate with polylactic acid and/or a copolymer of lactic acid and the other hydroxycarboxylic acid. However, the composition is characterized by having pearl gloss, that is, opaqueness.

Japanese Laid-Open Patent Hei 7-82369 has described a preparation process of a lactide-based polymer which comprises carrying out ring-opening addition polymerization of lactide with a polycarbonate-based polymer in the presence of an esterification catalyst. The polymer obtained has high strength and biodegradability. However, the polymer is opaque and liable to lower the glass transition temperature as compared with the polylactide.

Consequently, the object of the present invention is to provide a degradable copolymer having an excellent transparency which can overcome the above disadvantages of conventional techniques and improve melt-flowability while maintaining excellent thermal and mechanical properties.

The copolymer of the invention has high transparency which cannot be attained by a resin composition comprising blending polycarbonate with acrylic resins or polylactic acid and/or a copolymer of lactic acid and the other hydroxycarboxylic acid, or a copolymer of lactide and a polycarbonate-based polymer. The copolymer of the invention also has superior degradability relative to the resin composition comprising blending polycarbonate with polylactic acid and/or a copolymer of lactic acid and the other hydroxycarboxylic acid. Further, the copolymer of the invention has a higher glass transition temperature as compared with aliphatic polyester which constitutes the degradable copolymer in the invention. The above stated characteristics which are superior to those obtained by conventional techniques can provide a still broader utilization field of the degradable copolymer.

That is, the object of the invention is to provide a degradable copolymer having at least the following five excellent physical properties and characteristics.

①  Excellent degradability which cannot be attained by conventional aromatic polycarbonate.

②  Excellent transparency equal to aromatic polycarbonate.

③  Excellent thermal resistance which cannot be attained by conventional aliphatic polyester.

④  Melt-flowability superior to conventional aromatic polycarbonate.

⑤  Processing ability superior to conventional aromatic polycarbonate.

SUMMARY OF THE INVENTION

As a result of an intensive investigation in order to solve the above subjects, the present inventors have found that a degradable copolymer which can achieve the above object can be obtained by reacting an aromatic polycarbonate in the presence of a catalyst with an aliphatic polyester which is represented by polylactic acid. Thus the invention has been completed.

That is, one aspect of the invention is a preparation process of a degradable copolymer comprising reacting an aromatic polycarbonate with an aliphatic polyester in the presence of a catalyst.

In the preparation process of the degradable copolymer in the invention, the reaction can be carried out in an organic solvent.

In the preparation process of the degradable copolymer in the invention, the moisture content of the organic solvent in the reaction system can be controlled by removing at least a portion of the organic solvent in the reaction system and additionally charging an organic solvent comprising a lesser or equal amount of moisture as compared with the moisture content of the removed organic solvent.

In the preparation process of the degradable copolymer in the invention, moisture content of the organic solvent in the reaction system can be controlled by removing at least a portion of the organic solvent in the reaction system, bringing the removed organic solvent into contact with a drying agent to remove the moisture, and successively charging the moisture-removed organic solvent to the reaction system.

In the preparation process of the degradable copolymer in the invention, the drying agent used in order to remove the moisture can be one or more compounds selected from the group consisting of a molecular sieve and an ion exchange resin.

In the preparation process of the degradable copolymer in the invention, the polycarbonate can have a glass transition temperature of 100° C. or more.

In the preparation process of the degradable copolymer in the invention, the aliphatic polyester can be polylactic acid and/or a copolymer of lactic acid and the other hydroxycarboxylic acid.

In the preparation process of the degradable copolymer in the invention, the catalyst can be one or more compounds selected from the group consisting of a tin-based, zinc-based, and titanium-based catalyst.

In the preparation process of the degradable copolymer in the invention, the organic solvents can be one or more solvent selected from the group consisting of hydrocarbon solvents, ether solvents and halogenated hydrocarbon solvents.

In the preparation process of the degradable copolymer in the invention, the reaction of the aromatic polycarbonate having the glass transition temperature of 100° C. or more and polylactic acid and/or a copolymer of polylactic acid and the other hydroxycarboxylic acid can be carried out in the presence of a tin-based catalyst in an organic solvent.

In the preparation process of the degradable copolymer in the invention, the reaction of the aromatic polycarbonate having the glass transition temperature of 100° C. or more and polylactic acid and/or a copolymer of polylactic acid and the other hydroxycarboxylic acid can be carried out in the presence of a tin-based catalyst in an organic solvent, while controlling the moisture content of the organic solvent by removing at least a portion of the organic solvent in the reaction system, bringing the removed organic solvent into contact with a drying agent to remove the moisture, and successively charging the moisture-removed organic solvent to the reaction system.

The degradable copolymer of the invention can be provided by the above preparation process.

The degradable copolymer of the invention is a copolymer having high transparency and a glass transition temperature higher than the glass transition temperature of the aliphatic polyester which constitutes the obtained degradable copolymer, wherein the degradable copolymer comprises an aromatic polycarbonate block and an aliphatic polyester block composed of a linear hydrocarbon and/or alicyclic hydrocarbon.

DETAILED DESCRIPTION OF THE PREFERRED EMBODIMENTS

Aromatic polycarbonate which can be used in the invention is prepared by reacting divalent phenol with a carbonate precursor with a known process such as a solution process and a fusion process.

Divalent phenol which can be used for the raw material of aromatic polycarbonate in the invention is a compound represented by the general formula (1) or (2):

wherein $Ar^1$, $Ar^2$ an $Ar^3$ are divalent aromatic groups, and X is a bonding group for connecting $Ar^1$ and $Ar^2$.

In the general formula (1) or (2), $Ar^1$, $Ar^2$ and $Ar^3$ are divalent aromatic groups, preferably a phenylene group. The phenylene group can have substituents. Exemplary substituents include a halogen atom, nitro, alkyl, cycloalkyl, alkenyl, aralkyl, aryl and alkoxyl group.

In a preferable combination of $Ar^1$ and $Ar^2$, both of $Ar^1$ and $Ar^2$ are p-phenylene groups, m-phenylene groups or o-phenylene groups, or one of them is a p-phenylene group and the other is a m-phenylene group or o-phenylene group. In a particularly preferred combination, both $Ar^1$ and $Ar^2$ are p-phenylene groups.

$Ar^3$ is a p-phenylene, m-phenylene or o-phenylene group, preferably a p-phenylene or m-phenylene group.

X is a bonding group which connects $Ar^1$ and $Ar^2$, and includes a single bond and divalent hydrocarbon group, and further includes —O—, —S—, —SO—, —SO$_2$—, —CO— and other divalent groups containing atoms other than carbon and hydrogen.

Representative divalent hydrocarbon groups include, for example, a methyene, ethylene, 2,2-propylidene, cyclohexylidene and other alkylidene groups; aryl substituted alkylidene groups; and hydrocarbon groups containing aromatic groups and other unsaturated hydrocarbon groups.

Specific divalent phenols which can be used in the invention include, for example, bis(4-hydroxyphenyl)methane, 1,1-bis(4'-hydroxyphenyl)ethane, 1,2-bis(4'-hydroxyphenyl)ethane, bis(4-hydroxyphenyl) phenylmethane, bis(4-hydroxyphenyl)diphenylmethane, bis(4-hydroxyphenyl)-1-naphthylmethane, 1,1-bis(4'-hydroxyphenyl)-1-phenylethane, 2,2-bis(4'-hydroxyphenyl) propane [bisphenol A], 2-(4'-hydroxyphenyl)-2-(3'-hydroxyphenyl)propane, 2,2-bis(4-hydroxyphenyl)-butane, 1,1-bis(4'-hydroxyphenyl)butane, 1,1-bis(4'-hydroxyphenyl)-2-methylpropane, 2,2-bis(4'-hydroxyphenyl)-3-methylbutane, 2,2-bis(4'-hydroxyphenyl) pentane, 3,3-bis(4'-hydroxyphenyl)pentane, 2,2-bis(4'-hydroxyphenyl)heptane, 2,2-bis(4'-hydroxyphenyl)octane, 2,2-bis(3'-methyl-4'-hydroxyphenyl)-propane, 2,2-bis(3'-ethyl-4'-hydroxyphenyl)-propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl)propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl) propane, 2,2-bis(3'-methoxy-4'-hydroxyphenyl)propane, 2,2-bis(3',5'-dimethyl-4'-hydroxyphenyl)propane, 2,2-bis(2', 3',5', 6'-tetramethyl-4-hydroxyphenyl)propane, 2,2-bis(3'-chloro-4'-hydroxyphenyl) propane, 2,2-bis(3',5'-dichloro-4'-hydroxyphenyl)-propane, 2,2-bis(3'-bromo-4'-hydroxyphenyl)propane, 2,2-bis(3',5'-dibromo-4'-hydroxyphenyl) propane, 2,2-bis(2',6'-dibromo-3',5'-dimethyl-4'-hydroxyphenyl)propane, bis(4-hydroxyphenyl) cyanomethane, 1-cyano-3,3-bis(4'-hydroxyphenyl) butane, 2,2-bis(4'-hydroxyphenyl)hexafluoropropane and other bis (hydroxyaryl)alkanes; 1,1-bis(4'-hydroxyphenyl)-cyclopentane, 1,1-bis(4'-hydroxyphenyl)cyclohexane, 1,1-bis(4'-hydroxyphenyl)cycloheptane, 1,1-bis(4'-hydroxyphenyl)cyclooctane, 1,1-bis(4'-hydroxyphenyl) cyclononane, 1,1-bis(4'-hydroxyphenyl)-cyclododecane, 1,1-bis(3'-methyl-4'-hydroxyphenyl)cyclohexane, 1,1-bis (3',5'-dichloro-4'-hydroxyphenyl) cyclohexane, 1,1-bis(3', 5'-dimethyl-4'-hydroxyphenyl)cyclohexane, 1,1-bis(4'-hydroxyphenyl)-4-methylcyclohexane, 1,1-bis(4'-hydroxyphenyl)-3,3,5-trimethylcyclohexane, 2,2-bis(4'-hydroxyphenyl)norbornane, 8,8-bis(4'-hydroxyphenyl)-tricyclo[5.2.1.0$^2$ $^,$ $^6$]decane, 2,2-bis(4'-hydroxyphenyl) adamantane and other bis(hydroxyaryl)cycloalkanes; 4,4'-dihydroxy-diphenyl ether, 3,3'-dimethyl-4,4'-dihydroxydiphenyl ether, ethyleneglycol bis(4-hydroxyphenyl)ether and other bis(hydroxyaryl) ethers; 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide, 3,3'-diphenyl-4,4'-dihydroxydiphenyl sulfide, 3,3', 5,5'-tetramethyl-4,4'-dihydroxydiphenyl sulfide and other bis(hydroxyaryl) sulfides; 4,4'-dihydroxydiphenyl sulfoxide, 4,4'-dihydroxy-3,3'-dimethyldiphenyl)sulfoxide and other bis(hydroxyaryl) sulfoxides; 4,4'-dihydroxydiphenyl sulfone, 4,4'-dihydroxy-3,3'-dimethyldiphenyl sulfone and other bis(hydroxyaryl)-sulfones; bis(4-hydroxyphenyl)ketone, bis(3-methyl-4-hydroxyphenyl)-ketone and other bis(hydroxyaryl)ketones; 6,6'-dihydroxy-3,3-3',3'-tetramethylspiro(bis)indan [spiroindanebisphenol], 7,7'-dihydroxy-3,3',4,4'-tetrahydro-4,4,4',4'-tetramethyl-2,2'-spirobls(2H-1-benzopyran) and other spiro compounds; trans-2,3-bis(4'-hydroxyphenyl)-2- butene, 9,9-bis(4'-hydroxyphenyl)fluorene, 3,3-bis(4'-hydroxyphenyl)-2-butanone, 1,6-bis(4'-hydroxyphenyl)-1,6-hexanedione, 1,1-dichloro-2,2-bis(4'-hydroxyphenyl) ethylene, 1,1-dibromo-2,2-bis(4'-hydroxyphenyl)-ethylene, 1,1-dichloro-2,2-bis(5'-phenoxy-4'-hydroxyphenyl) ethylene, α, α, α', α'-tetramethyl-α, α'-bis(4-hydroxyphenyl)-p-xylene, α, α, α', α'-tetramethyl-α, α'-bis(4-hydroxyphenyl)-m-xylene, 3,3-bis(4'-hydroxyphenyl) phthalide and other bis(4-hydroxyphenyl)derivatives; 1,5-dihydroxynaphthalene, 2,6-dihydroxynaphthalene, 2,7-dihydroxy-naphthalene, 4,4'-dihydroxybiphenyl hydroquinone, resorcinol and other aromatic dihydroxy compounds; and 3,6-bis[(4-hydroxyphenyl)methyl]-2,5-diketopiperazine, desaminotyrosylt-yramine, desaminotyrosyl-tyrosine hexyl ester, N-benzyloxycarbonyl-tyrosyltyrosine hexyl ester and other aminoacid derivatives.

Further, divalent phenol comprising ester bond obtained by reacting two moles of bisphenol A with one mole of isophthaloyl chloride or terephthaloyl chloride can also be used.

In the preparation process of the invention, bis(4-hydroxyphenyl)-alkanes are used more preferably, most preferably bisphenol A in particular in view of availability with ease and properties of polycarbonate prepared. Specific examples of polycarbonate prepared by using bisphenol A as a principal raw material include PANRITE K-1300 manufactured by Teijin Kasei Co. and other equivalent products of other companies.

These divalent phenols can be used singly or as a mixture. Further, aromatic polycarbonate obtained from these divalent phenols can be used as a mixture.

Carbonate precursors which can be used as a raw material of aromatic polycarbonate in the invention include, for example, carbonyl halide, carbonyl ester and haloformate, more specifically include phosgene, diphenyl carbonate and dihaloformate of divalent phenol. These can be used singly or as a mixture.

Aromatic polycarbonate used in the invention can be prepared by reacting the above divalent phenol with the carbonate precursor through a known process. A suitable molecular weight regulator, branching agent and other modifies can be added in the preparation of aromatic polycarbonate.

In the preparation process of the invention, it is preferred to use polycarbonate having a glass transition temperature of 100° C. or more.

No particular limitation is imposed upon the molecular weight of aromatic polycarbonate used in the invention. Aromatic polycarbonate has a weight average molecular weight of preferably 10,000–100,000, more preferably 30,000–80,000 in view of thermal and mechanical properties of the copolymer obtained.

Aromatic polycarbonate used in the invention can be any type selected from linear structure, macrocyclic structure, branched structure, star structure and three dimensional network structure.

Aromatic polycarbonate used in the invention can be a homopolymer (aromatic polycarbonate) or a copolymer (aromatic copolycarbonate).

When aromatic polycarbonate is a copolymer, the mode of configuration can be any type selected from a random copolymer, alternating copolymer, block copolymer and graft copolymer.

Aliphatic polyester used in the preparation process of the invention includes polyhydroxycarboxylic acid obtained from one or more hydroxycarboxylic acids such as lactic acid, glycolic acid, 3-hydroxybutyric acid, 4-hydroxybutyric acid, 3-hydroxyvaleric acid, 5-hydroxyvaleric acid, and 6-hydroxycaproic acid.

Another type of aliphatic polyester used in the preparation process of the invention includes aliphatic polyester obtained by reacting polyhydric alcohol such as ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol and 1,4-hexanediol or alicyclic polyhydric alcohol such as cyclohexanedimethanol and hydrogenated bisphenol-A, with polybasic acid such as succinic acid, oxalic acid, malonic acid, glutaric acid, adipic acid, pimelic acid, suberic acid, azeleic acid, sebacic acid, undecanoic diacid, and polyhydric alcohols and polybasic acids can be used as a mixture, when necessary.

When these hydroxycarboxylic acids, polyhydric alcohols and polybasic acids have an asymmetric carbon atom in the molecule, D-isomer or L-isomer can be individually used singly, or a mixture of D- and L-isomer, that is, a racemic compound can also be used.

Further, aliphatic polyester which can be used in the preparation process of the invention includes copolyester prepared from the above hydroxycarboxylic acids, polyhydric alcohols and polybasic acids.

As an aliphatic polyester which can be used in the invention, polylactic acid and a copolymer of lactic acid with the other hydroxycarboxylic acid (hereinafter referred to as lactic acid-based polymer) can be used preferably, more preferably polylactic acid.

Polylactic acid can be usually prepared from a cyclic dimer of lactic acid called lactide by a known ring-opening polymerization process. The copolymer of lactic acid with the other hydroxycarboxylic acid can be generally prepared from lactide and a cyclic ester intermediate of hydroxycarboxylic acid by a known process through ring-opening polymerization.

When the lactic acid-based polymer is prepared by a direct dehydration polycondensation process and not by way of ring-opening polymerization, lactic acid and other hydroxycarboxylic acid, when needed, are subjected to azeotropic dehydration condensation preferably in the presence of an organic solvent, a phenyl ether-based solvent in particular, more preferably by removing water from the azeotropically distilled solvent and returning the solvent dehydrated substantially to the reaction system. The lactic acid-based polymer provided by such process can obtain a degree of polymerization suited for the invention.

As to the lactic acid raw material, any of L- and D-lactic acid and a mixture thereof can be used for the invention. The other hydroxycarboxylic acids which can be used in combination with lactic acid include the above stated hydroxycarboxylic acids. Particularly preferred hydroxycarboxylic acids are glycolic acid, 3-hydroxybutyric acid, 4-hydroxybutyric acid, 4-hydroxyvaleric acid, 5-hydroxyvaleric acid and 6-hydroxycaproic acid.

Suitable molecular weight modifiers, branching agents and other modification agents can be added in the preparation of the lactic acid-based polymer.

Generally, the melt viscosity of aromatic polycarbonate is much higher than that of aliphatic polyester, and the melt viscosity of aliphatic polyester in the invention has no adverse effect on the melt viscosity improvement of the copolymer. Consequently, no particular limitation is put upon the molecular weight of aliphatic polyester. However, in consideration of the thermal and mechanical properties of the copolymer obtained by the preparation process of the invention, the aliphatic polyester used has a weight average molecular weight of preferably 30,000 or more, more preferably 50,000–300,000.

In the aliphatic polyester used in the invention, the copolyester can have any mode of configuration selected from a random copolymer, alternating copolymer, block copolymer and graft copolyester.

Aliphatic polyester can be used as a mixture in the invention.

Aliphatic polyester used in the invention can be any type selected from a linear structure, macrocyclic structure, branched structure, star like structure and three dimensional network structure.

As to the amounts of aromatic polycarbonate and aliphatic polyester for use in the preparation process of the invention, aromatic polycarbonate to preferably 10–50% by weight and aliphatic polyester is preferably 90–50% by weight in view of enhancing degradability of the degradable copolymer obtained. On the other hand, in view of improving thermal resistance, aromatic polycarbonate is preferably 50–90% by weight and aliphatic polyester, is preferably 50–10% by weight. Consequently, as a whole, aromatic polycarbonate can be used in the range of 10–90% by weight, and aliphatic polyester can be used in the range of 90–10% by weight. The degradable copolymers having various properties can be obtained with depending upon the proportion of these two materials.

No particular restriction is imposed upon the catalyst used in the invention so long as the catalyst can substantially accelerate the reaction velocity.

Specific examples of the catalyst which can be used in the preparation process of the invention usually include metals of the Groups II, III, IV and V in the periodic table and oxides and salts thereof.

More specific examples of the catalyst include zinc powder, tin powder, aluminum, magnesium and other metals; tin oxide, antimony oxide, zinc oxide, aluminum oxide, magnesium oxide, titanium oxide and other metal oxides; stannous chloride, stannic chloride, stannous bromide, stannic bromide, antimony fluoride, zinc chloride, magnesium chloride, aluminum chloride e and other metal halides; tin sulfate, zinc sulfate, aluminum sulfate and other metal sulfates; magnesium carbonate, zinc carbonate and other metal carbonates; tin acetate, tin octoate, tin lactate, zinc acetate, aluminum acetate and other organic metal carboxylates; tin trifluoromethanesulfonate, zinc trifluoromethanesulfonate, magnesium trifluoromethanesulfonate, tin methanesulfonate, tin p-toluenesulfonate and other organic sulfonate salts; and zinc borate. In these catalysts, tin powder, stannous oxide, zinc borate and zinc acetate are preferred.

Other exemplary catalysts include dibutyltin oxide and other organometal oxides of the above metals, titanium isopropoxide and other metal alkoxides of the above metals, and diethyl zinc and other alkyl metal compounds of the above metals. In these catalysts, titanium isopropoxide is preferably used.

These catalysts can be used singly or as a mixture.

No particular limitation is imposed upon the amount of the catalyst in the invention so long as the amount substantially accelerates the reaction velocity. Generally the amount of the catalyst is preferably in the range of 0.0001–5% by weight for the amount of copolymer obtained, more preferably in the range of 0.001–1% by weight in view of economy.

In the preparation process of the degradable copolymer of the invention, aromatic polycarbonate and aliphatic polyester can be subjected to a reaction in the presence of a catalyst under a molten state, or by dissolving in an organic solvent.

In the preparation process of a degradable copolymer in the invention, no particular restriction is put upon the organic solvent for use in the process so long as the organic solvent can substantially maintain the progress of the reaction.

Specific examples of the organic solvents which can be used in the invention include, for example, benzene, toluene, xylene, mesitylene and other hydrocarbon solvents; chlorobenzene, bromobenzene, iodobenzene, dichlorobenzene, 1,1,2,2-tetrachloroethane, p-chlorotoluene and other halogenated hydrocarbon solvents; 3-hexanone, acetophenone, benzophenone and other ketone solvents; dibutyl ether, anisole, phenetole, o-dimethoxybenzene, p-dimethoxybenzene, 3-methoxytoluene, dibenzyl ether, benzyl phenyl ether, methoxynaphthalene and other ether solvents; phenyl sulfide, thioanisole and other thioether solvents; methyl benzoate, methyl phthalate, ethyl phthalate and other ester solvents; diphenyl ether, 4-methylphenyl ether, 3-methylphenyl ether, 3-phenoxytoluene and other alkyl-substituted diphenyl ethers; 4-bromophenyl ether, 4-chlorophenyl ether, 4-bromodiphenyl ether, 4-methyl-4-bromodiphenyl ether and other halogen substituted diphenyl ethers; 4-methoxydiphenyl ether, 4-methoxyphenyl ether, 3-methoxyphenyl ether, 4-methyl-4-methoxydiphenyl ether and other alkoxy substituted diphenyl ethers; and dibenzofuran, xanthene and other cyclic diphenyl ether solvents. These solvents can be used singly or as a mixture. Diphenyl ether and dichlorobenzene are preferred of these solvents.

No particular limitation is imposed upon the amount of organic solvents used in the invention so long as the reaction progress can be substantially maintained. However in view of industry, the amount is generally determined by considering reaction velocity, purity of reaction product, volume efficiency and solvent recovery. Generally, the amount is preferably in the range of 10–80% when converted to the concentration of the degradable copolymer obtained.

The solvent used in the invention preferably has a high boiling point, more preferably a boiling point of 180° C. or more.

In the preparation process of the invention, the reaction preferably progresses while removing water formed in the reaction. Accordingly, preferred solvents can readily be separated from water by separating means such as distillation. When the organic solvent used in the reaction system of the invention can substantially separate water by any means, whether or not the solvent can form an azeotrope with water or whether or not the solvent can separate from water is no problem.

In the preparation process of the invention, water which is generated in the course of the reaction and dissolved in the organic solvent of the reaction system, is liable to hydrolyze the degradable copolymer formed. Accordingly, in order to prevent the hydrolysis, the reaction can be suitably carried out by removing a portion of the solvent from the reaction system, dehydrating the solvent outside the reaction system by distillation or treatment with a drying agent, and returning the anhydrous solvent to the reaction system again. Generally, the reaction mixture has a moisture content of preferably 50 ppm or less, more preferably 20 ppm or less, most preferably 5 ppm or less.

Further the embodiments for dehydration treatment of the organic solvent in the reaction system of the invention further include a process for previously charging an excess amount of the organic solvent and carrying out dehydration merely by discharging the organic solvent, and a process for drying the organic solvent in the reaction system by using another organic solvent. Furthermore, as a modification of these embodiments, moisture can be removed from the organic solvent itself in the reaction system while maintaining the liquid state.

No particular restriction is put upon the drying agent for use in dehydrating the organic solvent of the invention so long as the drying agent can remove moisture from the organic solvent in the reaction system to an extent that the reaction progress can be substantially maintained, an extent that a degradable copolymer having a satisfactorily high weight average molecular weight can be formed, or an extent that reversible hydrolysis of the reaction product can be inhibited.

Representative drying agents which can be used in the invention include, for example, molecular sieve 3A, molecular sieve 4A, molecular sieve 5A, molecular sieve 13X and other grades of molecular sieves, ion exchange resins, alumina, silica gel, calcium chloride, calcium sulfate, diphosphorus pentoxide, concentrated sulfuric acid, magnesium perchlorate, barium oxide, calcium oxide, potassium hydroxide, sodium hydroxide, metal hydrides such as calcium hydride, sodium hydride, lithium hydride and aluminum hydride, and alkali metals such as sodium. These drying agents can be used singly or as a mixture. In these drying agents, molecular sieves and ion exchange resins, cation exchange resin in particular, are generally preferred in view of handling and recovery with ease.

When the reaction is carried out under a molten state in the preparation process of the invention, the reaction temperature depends upon the ingredients which can exist in the overall course of the reaction, that is, aromatic polycarbonate and aliphatic polyester raw materials and the degradable copolymer formed. However, no particular limitation is imposed upon the reaction temperature so long as these ingredients can substantially maintain the molten state, do not decompose by heating, and can maintain the reaction progress. The reaction is preferably carried out in the range of 100°–220° C. or more preferably in the range of 100°–200° C., in consideration of forming velocity and thermal decomposition velocity of the degradable copolymer.

When an organic solvent is used in the preparation process of the invention, no particular limitation is put upon the reaction temperature so long as the organic solvent existing in the reaction system can hold a liquid state and maintain reaction progress. However, in view of the formation velocity and thermal decomposition velocity of the formed degradable copolymer, the reaction temperature is preferably in the range of 90°–200° C., more preferably 110°–180° C.

The reaction is generally carried out under atmospheric pressure at the distillation temperature of the organic solvent used. When a high boiling organic solvent is used, the reaction can also be carried out under reduced pressure in order to maintain the reaction temperature in a preferable range. Unfavorable side reactions are inhibited under reduced pressure and the dehydration reaction can progress efficiently. Even though the boiling point of the reaction mixture is reduced due to formation of an azeotropic mixture of the solvent and water, there is no problem so long as the reaction is carried out at the prescribed temperature.

In the preparation process of the invention, the reaction is preferably carried out under vacuum or in an atmosphere of nitrogen, argon and other inert gases while preventing contamination of moisture from outside of the system and removing the moisture generated in the system. The reaction can also be carried out while ventilating or bubbling with inert gas.

In the preparation process of the invention, the reaction can be carried out continuously or batch wise. Dehydration and charge of the solvent can also be carried out by continuous or batch procedures.

After finishing the reaction in the process of the invention, the resulting reaction product, that is, the degradable copolymer can be recovered from the reaction mixture by any known method in public use. No particular restriction is put upon the method so long as the reaction product can be recovered with the desired purity.

The reaction product can be recovered, for example, by the following process. After finishing the reaction, an excess amount of a poor solvent such as isopropyl alcohol is added at a suitable temperature to the reaction mixture which dissolves the reaction product. The precipitated crystals of the reaction product are recovered by decantation or filtration, thoroughly washed with a poor solvent of the crystals, and dried.

The degradable copolymer which can be obtained by the preparation process of the invention comprises an aromatic polycarbonate block and an aliphatic polyester block composed of a linear hydrocarbon and/or alicyclic hydrocarbon.

The degradable copolymer which can be obtained by the preparation process of the invention has excellent degradability which cannot be exhibited by common aromatic polycarbonate, excellent transparency equal to aromatic polycarbonate, excellent thermal resistance which cannot be exhibited by common aliphatic polyester, melt flowability superior to common aromatic polycarbonate, and processing ability superior to common aromatic polycarbonate.

These characteristics will be more specifically illustrated below.

Aromatic polycarbonate which is a raw material in the preparation process of the invention is stable in a compost-pile. On the other hand, the degradable copolymer which is obtained by the invention and comprises merely 10% by weight of the aliphatic polyester easily collapses in the compostpile. The collapsing velocity enhances with an increase in quantity of aliphatic polyester. Consequently, environmentally friendly molded articles such as bottles and other containers can be prepared from the degradable copolymer of the invention.

The degradable copolymer obtained by the preparation process of the invention has a high transparency. A hot-press film having a thickness of 100 μm generally has a Haze of 5% or less. The preparation process of the invention can readily provide a degradable copolymer having a transparency of 1% or less/100 μm in Haze which is almost equal to the Haze of aromatic polycarbonate or polyethylene terephthalate. Consequently the degradable copolymer obtained in the invention distinctly differs from the composition obtained by blending aromatic polycarbonate with aliphatic polyester or a lactide-based copolymer obtained by ring-opening addition polymerization of lactide and polycarbonate.

The degradable copolymer obtained by the preparation process of the invention has no peak due to ester exchange in the $^{13}$C-NMR spectrum. The fact assumes that the degradable copolymer of the invention has a highly blocked structure. At the same time, the degradable copolymer obtained by the preparation process of the invention may be presumed to act as a compatibilizer and to provide transparency by enhancing mutual solubility of aliphatic polyester and aromatic polycarbonate.

The glass transition temperature of the degradable copolymer obtained in the preparation process of the invention is higher than that of the aliphatic polyester which constitutes the degradable copolymer. For example, the degradable copolymer obtained by reacting 80 parts by weight of polylactic acid with 20 parts by weight of aromatic polycarbonate has a glass transition temperature of 8° C. or more higher than that of polylactic acid and the glass transition temperature is almost equal to that of polyethylene terephthalate. The glass transition temperature of the degradable copolymer obtained by the preparation process of the invention depends upon the kind of aromatic polycarbonate and the proportion to aliphatic polyester and can be controlled to a desired temperature from the glass transition temperature of the aliphatic polyester which constitutes the degradable copolymer to that of the aromatic polycarbonate which constitutes the degradable copolymer. Thus, the degradable copolymer of the invention is expected to provide aliphatic polyester with a further extended field of use which has been conventionally restricted due to thermal resistance. In order to use the degradable copolymer of the invention in a broader field than aliphatic polyester, the glass transition temperature of the degradable copolymer is preferably 5° C. or more, more preferably 10° C. or more higher than that of aliphatic polyester which constitutes the degradable copolymer.

As will be illustrated in the examples, the degradable copolymer of the invention exhibits twice or more melt-flowability as compared with aromatic polycarbonate raw material, has an excellent processing ability, and is expected to provide a wider field of use, as compared with aromatic polycarbonate.

The weight average molecular weight and molecular weight distribution of the degradable copolymer obtained by the preparation process of the invention can be controlled to the desired range by suitably selecting the kind of the solvent, the kind and amount of the catalyst, the reaction temperature, reaction time, treatment method of azeotropically distilled solvent, dehydration grade of the solvent in the reaction system and other reaction conditions.

No particular limitation is put upon the weight average molecular weight of the degradable copolymer obtained by the preparation process of the invention. Generally, the weight average molecular weight is preferably in the range of 30,000–400,000, more preferably in the range of 50,000–200,000.

The degradable copolymer obtained by the preparation process of the invention can be suitably incorporated with various additives depending upon the object and use in the range giving no adverse effect on the properties of the resultant copolymer. Exemplary additives which can be added include various elastomers such as SBR, NBR and SBS type thermoplastic elastomers; addition agents such as a plasticizer, pigment, stabilizer, mold release agent, flame retardant, antioxidant, ultraviolet absorber, antibacterial agent and dyestuff; fillers such as calcium carbonate, clay, carbon black, impact resistant core/shell type particle and impact modifier; and colorants such as titanium oxide, metallic colorants and pearl colorants.

Further, the degradable copolymer obtained by the preparation process of the invention can be blended with aromatic polycarbonate and/or aliphatic polyester. An effect similar to that of the degradable copolymer of the invention can also be expected by such blending.

The degradable copolymer obtained by the preparation process of the invention can be used in a field broader than that of aromatic polycarbonate or aliphatic polyester. The degradable copolymer combines thermal resistance and non-toxicity of polycarbonate with degradability and safety of aliphatic polyester. Consequently, the degradable copolymer of the invention is suited for use in the field which requires thermal resistance and the field of food and medical industry.

The degradable copolymer obtained by the preparation process of the invention can be processed by injection molding, extrusion forming, blow molding and other processing methods into various formed articles. Exemplary formed articles which can be prepared include, for example, a lunch box, dinner set, container of lunch and daily dishes sold in a convenience store, chopsticks, fork, spoon, nursing bottle, feeding cup, pumped or pumpless bottle for shampoo and liquid soap, cosmetic container, detergent container, bleaching solution container, artificial dialyzer case, and member of infusion apparatus.

EXAMPLES

The present invention will hereinafter be illustrated further in detail by way of examples. However, these examples are not considered to limit the scope of the invention.

The descriptions "%", "part" and "molecular weight" in the examples and comparative examples are on the basis of weight unless otherwise noted.

Weight average molecular weight was measured by gel permeation chromatography using polystyrene as a reference.

Properties in the examples and comparative examples were evaluated by the following methods.

(1) Tensile strength and elongation at break:
Measured in accordance with ASTM-D638 by using a film of 100 $\mu$m in thickness obtained by hot-pressing at 240° C.

(2) Flexural modulus and flexural strength:
Measured in accordance with ASTM-D790 by using a specimen injection-molded at temperature of 250°–280° C.

(3) Heat distortion temperature:
Measured in accordance with ASTM-D648 by using a specimen injection-molded at temperature of 250°–280° C.

(4) Melt-flowability improving effect:
A mold of Archimedean spiral having a flow thickness of 1 mm and flow width of 10 mm was used. The flow length was measured at resin temperature of 280° C., mold temperature of 100° C. and injection pressure of 500 kgf/cm$^2$.

Further, the flow-length of aromatic polycarbonate was measured under the same injection pressure.

Flow-lengths of both aromatic polycarbonate and the degradable copolymers were compared and results were divided into the following three classes.

(A) Degradable copolymer had a flow length of more than 3 times — Improving effect was great
(B) Degradable copolymer had a flow length of more than 2–3 times — Improving effect was small
(C) Degradable copolymer had a flow length of less than twice — Improving effect was poor (5) Haze:
Haze was measured in accordance with JIS K-6714 by using a film of 100 $\mu$m in thickness obtained by hot-pressing at 240° C. A Haze-meter TC-HIII (manufactured by Tokyo Denshoku Co.) was used for the measurement.

(6) Degradability:

A film of 100 μm in thickness obtained by hot-pressing at 240° C. was used as a specimen and buried in a fermenting compostpile at 58° C. for 105 days. Evaluation was carried out by visual observation.

(7) Izod impact resistance:

Measured in accordance with ASTM-D256 by using a specimen injection-molded at temperature of 250–280° C.

Example 1

To a mixture of 128.6 g of L-polylactic acid having an weight average molecular weight of 100,000, 32.2 g of polycarbonate PANLITE: K-1300 (manufactured by Teijin Kasei Co.) having an weight average molecular weight of 58,000 and 0.74 g of stannous oxide, 482 g of o-dichlorobenzene having a moisture content of 10 ppm or less was added. A tube packed with 70 g of molecular sieve 3 A and containing 96.5 g of o-dichlorobenzene having a moisture content of 10 ppm or less was mounted on the reaction vessel so as to return the solvent distilled by reflux to the reaction system again by way of the molecular sieve layer. The reaction was carried out with stirring at 150° C./320 mmHg for 10 hours while preventing contamination of moisture into the reaction system. The solvent had a moisture content of 2 ppm after passing through the molecular sieve layer.

To the reaction mixture, 800 ml of a 0.7% hydrochloric acid/isopropyl alcohol solution was added, stirred for an hour and filtered under suction. The procedure was repeated again to remove tin powder. The filter cake was stirred in 600 ml of isopropyl alcohol and filtered under suction.

The procedure was repeated until the filtrate became neutral. Successively, the filter cake was dried in hot air at 60° C. The copolymer obtained was 141.5 g (88.0% yield), and had a weight average molecular weight of 86,000. The copolymer had a glass transition temperature of 66.9° C. as a result of differential thermal analysis.

Physical properties of the degradable copolymer were measured and results are illustrated in Table 1.

At the end of the burial test, the film was almost completely degraded and the shape was scarcely confirmed by visual observation.

Example 2

To a mixture of 15.8 g of poly-L-lactic acid having an weight average molecular weight of 130,000, 142.3 g of polycarbonate: PANLITE K-1300 (manufactured by Teijin Kasei Co.) having a weight average molecular weight of 58,000, and 0.08 g of stannous oxide, 471 g of o-dichlorobenzene having a moisture content of 10 ppm or less was added. A tube packed with 70 g of molecular sieve 3A and containing 95.3 g of o-dichlorobenzene having a moisture content of 10 ppm or less was mounted on the reaction vessel so as to return the solvent distilled by reflux to the reaction system again by way of the molecular sieve layer. The reaction was carried out with stirring at 150° C./320 mmHg for 17 hours while preventing contamination of moisture into the reaction system. The solvent had a moisture content of 2 ppm after passing through the molecular sieve layer.

To the reaction mixture, 800 ml of a 0.7% of hydrochloric acid/isopropanol solution was added, stirred for an hour and filtered under suction. The procedure was repeated again to eliminate tin powder. The filter cake was stirred in 600 ml of isopropyl alcohol and filtered under suction. The procedure was repeated until the filtrate became neutral. Successively, the filter cake was dried in a hot air at 60° C. The copolymer obtained was 123.4 g (78.1% yield), and had a weight average molecular weight of 52,000. The copolymer had a glass transition temperature of 62.7° C. and 133.4° C. as a result of differential thermal analysis.

Physical properties of the degradable copolymer were measured and results are illustrated in Table 1.

At the end of the burial test, most of the film was degraded and the shape of the film was observed on a very small portion of the specimen.

Example 3

A polylactic acid/polybutylene succinate, copolymer comprising 80% of poly-L-lactic acid and 20% of polybutylene succinate (PBS) and having a weight average molecular weight of 80,000 was used as a raw material. To a mixture of 15.8 g of the polylactic acid/PBS copolymer, 142.3 g of polycarbonate: PANLITE K-1300 having an weight average molecular weight of 58,000 (manufactured by Teijin Kasei Co.) and 0.65 g of tin powder, 482 g of diphenyl ether having a moisture content of 10 ppm or less was added. A tube packed with 70 g of molecular sieve 3A and containing 103.5 g of diphenyl ether having a moisture content of 10 ppm or less was mounted on the reaction vessel so as to return the solvent distilled by reflux to the reaction system again by way of the molecular sieve layer. The reaction was carried out with stirring at 150° C./33 mmHg for 23 hours while preventing contamination of moisture into the reaction system. The solvent had a moisture content of 2 ppm after passing through the molecular sieve layer.

To the reaction mixture, 800 ml of a 0.7% hydrochloric acid/isopropyl alcohol solution was added, stirred for an hour and filtered under suction. The procedure was repeated again to eliminate tin powder. The filter cake was stirred in 600 ml of isopropyl alcohol and filtered under suction. The procedure was repeated until the filtrate became neutral. Successively the filter cake was dried in hot air at 60° C. The copolymer obtained was 135.2 g (85.5% yield) and had a average molecular weight of 92,000. The copolymer had a glass transition temperature of 132.9° C. by differential thermal analysis.

Physical properties of the degradable copolymer were measured and results are illustrated in Table 1.

At the end of the burial test, most of the film was degraded and the shape of the film was observed on a very small portion of the specimen.

Comparative Example 1

80 Parts of poly-L-lactic acid having a weight average molecular weight of 110,000 was blended with 20 parts of polycarbonate: PANLITE L-1225 (manufactured by Teijin Kasei Co.) having a weight average molecular weight of 58,000. The blend was thoroughly mixed in a tumbling mixer, melt kneaded with a twin screw extruder of 37 mm in screw diameter and L/D=32 at fusion temperature of 250° C. under screw rotation of 80 rpm, extruded and cut into pellets. The pellets thus obtained were injection molded at 250°–280° C. to obtain test specimens.

Any of the specimens obtained had pearl gloss and were opaque. Physical properties of these specimens were measured and results are illustrated in Table 2.

At the end of the burial test, most of the film was degraded and the shape of the film was observed on a very small portion of the specimen.

Comparative Example 2

10 Parts of poly-L-lactic acid having a weight average molecular weight of 110,000 was blended with 90 parts of polycarbonate: PANLITE L-1225 (manufactured by Teijin Kasei Co.) having a weight average molecular weight of 58,000. The blend was thoroughly mixed in a tumbling mixer, melt kneaded with a twin screw extruder of 37 mm in screw diameter and L/D=32 at fusion temperature of 250° C. under screw rotation of 80 rpm, extruded and cut into pellets. The pellets thus obtained were injection molded at 250°–280° C. to obtain test specimens.

Any of the specimens obtained had pearl gloss and were opaque. Physical properties of these specimens were measured and results are illustrated in Table 2.

At the end of the burial test, the film became some weak but the shape was maintained as it was.

Comparative Example 3

A mixture of 128.6 g of L-lactide and 32.2 g of polycarbonate: PANLITE L-1300 (manufactured by Teijin Kasei Co.) having an weight average molecular weight of 58,000 was melted under nitrogen at 165° C. for an hour and 0.03 g of stannous octoate and 482 g of o-dichlorobenzene having a moisture content of 10 ppm or less were added.

A tube packed with 70 g of molecular sieve 3A and containing 96.5 g of o-dichlorobenzene having a moisture content of 10 ppm or less was mounted on the reaction vessel so as to return the reflux distilled solvent to the reaction system again by way of the molecular sieve layer.

The reaction was carried out with heat stirring at 165° C./520 mmHg for 8 hours while preventing contamination of moisture into the reaction system. The solvent had a moisture content of 2 ppm after passing through the molecular sieve layer.

To the reaction mixture, 800 ml of a 0.7% hydrochloric acid/isopropyl alcohol solution was added, stirred for an hour and suction filtered. The procedure was repeated again to eliminate tin powder. The filter cake was stirred in 600 ml of isopropyl alcohol and suction filtered. The procedure was repeated until the filtrate became neutral. Successively, the filter cake was dried in a hot air stream at 60° C. The copolymer obtained was 131.5 g (81.8% yield) and had an weight average molecular weight of 93,000. The copolymer had a glass transition temperature of 57.0° C. by differential thermal analysis.

At the end of the burial test, the film was almost completely degraded and the shape was scarcely confirmed by visual observation.

Comparative Example 4

In order to evaluate flowability of the degradable copolymers p repared in Examples 1–3, various properties of aromatic polycarbonate: PANLITE L-1300 (manufactured by Teijin Kasei Co.) having a weight average molecular weight of 58,000 are illustrated in Table 2.

Comparative Example 5

In order to evaluate thermal resistance of the degradable copolymers prepared in Examples 1 and 2, the glass transition temperature and heat distortion temperature of poly-L-lactic acid having a weight average molecular weight of 130,000 were measured.

The results are:

| | |
|---|---|
| Glass transition temperature: | 58° C. |
| Heat distortion temperature: | 57° C. |

As seen in these examples and comparative examples, the degradable copolymer of the invention is superior in degradability to the resin composition of aromatic polycarbonate and aliphatic polyester. Further, the resin composition and the copolymer of lactide with polycarbonate are opaque. On the other hand, the degradable copolymer of the invention is transparent while maintaining high melt-flowability and well-balanced mechanical properties.

TABLE 1

| | Example | | |
|---|---|---|---|
| | 1 | 2 | 3 |
| polylactic acid (parts) | 80 | 10 | |
| PBS/polylactic acid copolymer (parts) | | | 10 |
| polycarbonate (parts) | 20 | 90 | 90 |
| Tensile strength at break (kgf/cm$^2$) | 670 | 740 | 720 |
| Tensile elongation at break (%) | 7 | 7 | 10 |
| Flexural yield strength (kgf/cm$^2$) | 930 | 910 | 900 |
| Flexural modulus (kgf/cm$^2$) | 29300 | 26500 | 25500 |
| Heat distortion temperature (°C.) | 68 | 133 | 133 |
| Spiral flow length (mm) | 150 or more | 77.2 | 81.0 |
| Melt-flowability improving effect | great | great | great |
| Haze (%) | <1 | <1 | <1 |
| Degradability | good | good | good |
| Izod impact resistance (kgf-cm/cm) | 3.3 | 13.6 | 13.2 |

TABLE 2

| | Comparative Example | | | |
|---|---|---|---|---|
| | 1 | 2 | 3 | 4 |
| polylactic acid (parts) | 80 | 10 | | |
| PBS/polylactic acid copolymer (parts) | | | 80 | |
| polycarbonate (parts) | 20 | 90 | 20 | 100 |
| Tensile strength at break (kgf/cm$^2$) | 680 | 730 | 670 | 760 |
| Tensile elongation at break (%) | 8 | 8 | 8 | 8 |

TABLE 2-continued

|  | Comparative Example | | | |
| --- | --- | --- | --- | --- |
|  | 1 | 2 | 3 | 4 |
| Flexural yield strength (kgf/cm$^2$) | 920 | 900 | 930 | 900 |
| Flexural modulus (kgf/cm$^2$) | 28500 | 25100 | 28000 | 23000 |
| Heat distortion temperature (°C.) | 59 | 134 | 58 | 135 |
| Spiral flow length (mm) | 150 or more | 74.5 | 150 or more | 19.8 |
| Melt-flowability improving effect | great | great | great | — |
| Haze (%) | 71.4 | 72.0 | 62.5 | <1 |
| Degradability | good | poor | good | poor |
| Izod impact resistance (kgf-cm/cm) | 3.6 | 13.0 | 3.5 | 90 |

What is claimed is:

1. A preparation process of a degradable copolymer comprising reacting an aromatic polycarbonate having aromatic groups in the polymer backbone with an aliphatic polyester prepared from i) at least one aliphatic hydroxycarboxylic acid, ii) at least one aliphatic polyhydric alcohol and at least one aliphatic polybasic acid, iii) at least one alicyclic polyhydric alcohol and at least one aliphatic polybasic acid, or iv) mixtures thereof in the presence of a catalyst.

2. The preparation process of the degradable copolymer according to claim 1, wherein the reaction is carried out in an organic solvent.

3. The preparation process of the degradable copolymer according to claim 2, wherein moisture content of the organic solvent in a reaction system is controlled by removing at least a portion of the organic solvent in the reaction system and additionally charging an organic solvent comprising a lesser or equal amount of moisture as compared with the moisture content of the removed organic solvent.

4. The preparation process of the degradable copolymer according to claim 2, wherein moisture content of the organic solvent in a reaction system is controlled by removing at least a portion of the organic solvent in the reaction system, bringing the removed organic solvent into contact with a drying agent to remove the moisture, and successively charging the dehydrated organic solvent to the reaction system.

5. The preparation process of the degradable copolymer according to claim 4, wherein the drying agent is one or more compounds selected from the group consisting of a molecular sieve and an ion exchange resin.

6. The preparation process of the degradable copolymer according to 1, wherein the aromatic polycarbonate has glass transition temperature of 100° C. or more.

7. The preparation process of the degradable copolymer according to claim 1, wherein the aliphatic polyester is polylactic acid and/or a copolymer of lactic acid and the other hydroxycarboxylic acid.

8. The preparation process of the degradable copolymer according to claim 1, wherein the catalyst is one or more compounds selected from the group consisting of a tin-based, zinc-based, and titanium-based catalyst.

9. The preparation process of the degradable copolymer according to claim 2, wherein the organic solvents is one or more solvent selected from the group consisting of non-halogenated solvents, ether solvents and halogenated hydrocarbon solvents.

10. The preparation process of the degradable copolymer according to claim 2, wherein the aromatic polycarbonate has glass transition temperature of 100° C. or more, the aliphatic polyester is polylactic acid and/or a copolymer of lactic acid and the other hydroxycarboxylic acid and the catalyst is a tin-based catalyst.

11. The preparation process of the degradable copolymer according to claim 3, wherein the aromatic polycarbonate has glass transition temperature of 100° C. or more, the aliphatic polyester is polylactic acid and/or a copolymer of polylactic acid and the other hydroxycarboxylic acid and the catalyst is a tin-based catalyst.

12. The preparation process of the degradable copolymer according to claim 4, wherein the aromatic polycarbonate has glass transition temperature of 100° C. or more, the aliphatic polyester is polylactic acid and/or a copolymer of polylactic acid and the other hydroxycarboxylic acid and the catalyst is a tin-based catalyst.

13. The degradable copolymer obtained by the preparation process according to claim 1.

14. The degradable copolymer obtained by the preparation process according to claim 2.

15. The degradable copolymer obtained by the preparation process according to claim 10.

16. The degradable copolymer obtained by the preparation process according to claim 11.

17. The degradable copolymer obtained by the preparation process according to claim 12.

18. A degradable copolymer comprising an aromatic polycarbonate block having aromatic groups in the polymer backbone and an aliphatic polyester block prepared from i) at least one aliphatic hydroxycarboxylic acid, ii) at least one aliphatic polyhydric alcohol and at least one aliphatic polybasic acid, iii) at least one alicyclic polyhydric alcohol and at least one aliphatic polybasic acid, or iv) mixtures thereof, wherein said copolymer has high transparency and a glass transition temperature higher than that of the aliphatic polyester forming the aliphatic polyester block.

* * * * *